Figure 1:
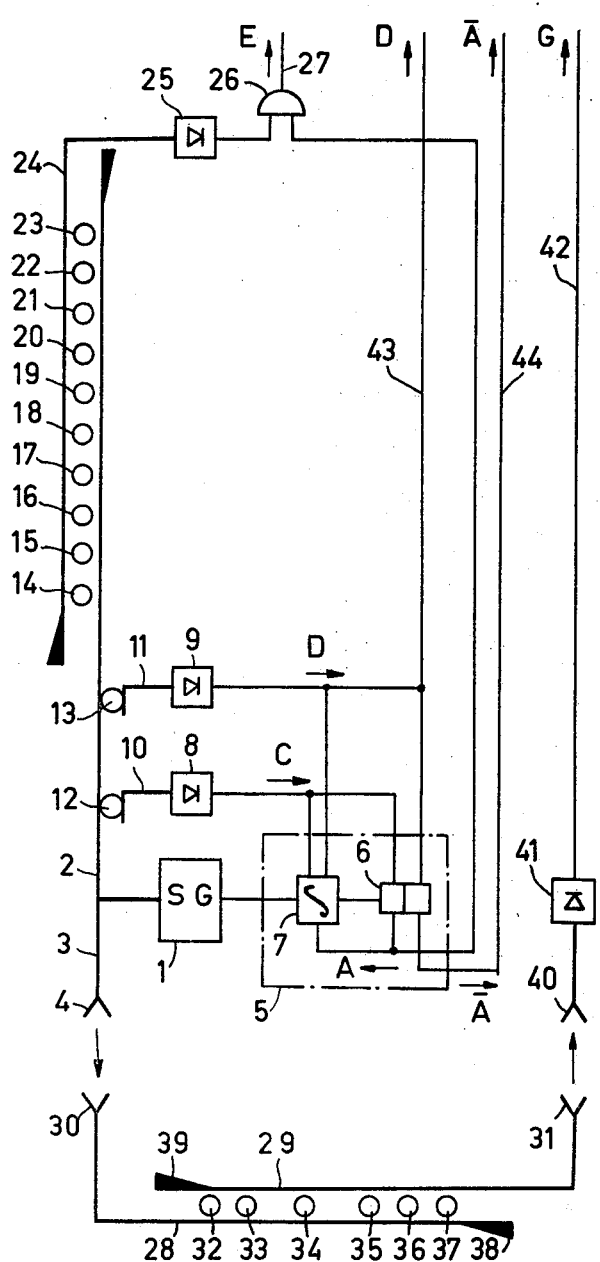

Nov. 14, 1967 N. A. E. WÄSTERLID 3,353,178
IDENTIFICATION EQUIPMENT
Filed Feb. 18, 1966 6 Sheets-Sheet 4

INVENTOR.
NILS A. E. WASTERLID
BY
AGENT

United States Patent Office 3,353,178
Patented Nov. 14, 1967

3,353,178
IDENTIFICATION EQUIPMENT
Nils Arne Erland Wästerlid, Skolby, Sweden, assignor to North American Philips Company, Inc., New York, N.Y., a corporation of Delaware
Filed Feb. 18, 1966, Ser. No. 528,598
Claims priority, application Sweden, Feb. 18, 1965, 2,142/65
10 Claims. (Cl. 343—6.5)

The present invention relates to an equipment for identification of an object which is movable past a measuring station, such as a railway carriage or the like, by means of an inquiry device situated at the measuring station and adapted to transmit an inquiry signal. A reply unit is situated upon the object and adapted to respond to the said inquiry signal in a specific way characteristic for the object. The equipment is of the type in which high frequency electromagnetic energy is used for transmission of the information required for the identification. An identification equipment operating with radio frequency signals is known in which the reply unit has a transmitter which is excited by means of a signal transmitted from the inquiry device and which due to this excitation retransmits a reply signal with characteristic form to the inquiry device. The signals in this known device are modulated carrier signals of different frequencies. This known system has the drawback that the reply unit necessarily will be relatively complicated since it comprises a complete transmitter having at least one active element, such as a transistor or the like. The presence of active elements in the reply unit also brings about increased risks for error function and increased costs of maintenance.

The purpose of the invention is to produce an identification equipment in which the reply unit can be made more simple and compact than in known systems and in which the reply unit does not contain any active elements.

This is achieved in an identification equipment according to the invention in that the inquiry device comprises generator means for producing electromagnetic wave energy of high frequency. The generator means cooperates with a sweep generator for sweeping the frequency repeatedly across a certain frequency band. An antenna is provided for transmitting the energy directionally to the reply unit and that the said reply unit comprises a wave guide system connected with a plurality of cavity resonators having different resonance frequencies lying within the frequency band of the transmitted energy for forming a code which is characteristic for the object by modifying the wave energy transmitted through the system in response to the natural frequencies of the resonators. The input of the system is connected to a receiving antenna for reception of the said electromagnetic wave energy and its output is connected to a transmitting antenna for retransmitting to the detecting station the transmitted wave energy as modified by the said resonators. Means are also provided more arranged in the detecting station for receiving the re-transmitted energy from the reply unit and evaluating the reply signal by determining the modification in the re-transmitted wave energy caused by the said cavity resonators.

Thus, the invention is based upon the principle of coupling back to the detecting station a portion of the high frequency energy transmitted to the reply unit. The information is then given by the frequencies which are blocked by the resonators in the reply unit and the frequencies which are passed through the unit. Thus all active elements in the reply unit will be superfluous and the reply unit only serves as a "reflector" for transmission of reply information in coded shape.

The reply unit comprises in a preferred embodiment two wave guides with the said cavity resonators arranged in parallel between the wave guides for coupling the wave guides to each other through the resonators. One of the wave guides having an input end connected to the said receiving antenna for reception of the transmitted high frequency wave energy, and the second wave guide has an output end connected to the transmitting antenna for retransmission of energy, so that high frequency wave energy is coupled from the receiving antenna to the retransmitting antenna upon coincidence between the frequency of the transmitted energy and the natural frequency of any of the resonators in the reply unit.

The risk of direct coupling between the transmitting and receiving means at the inquiry side will be decreased if polarized microwave energy is used, and the polarization in the two paths of transmission in direction to and from the reply unit respectively are rotated 90° relative to each other. A simple way of achieving such rotation of the polarization planes is to use as transmitting and receiving means cooperating wave guide horns which are rotated 90° relative to each other in the two transmission paths.

Figure 2:
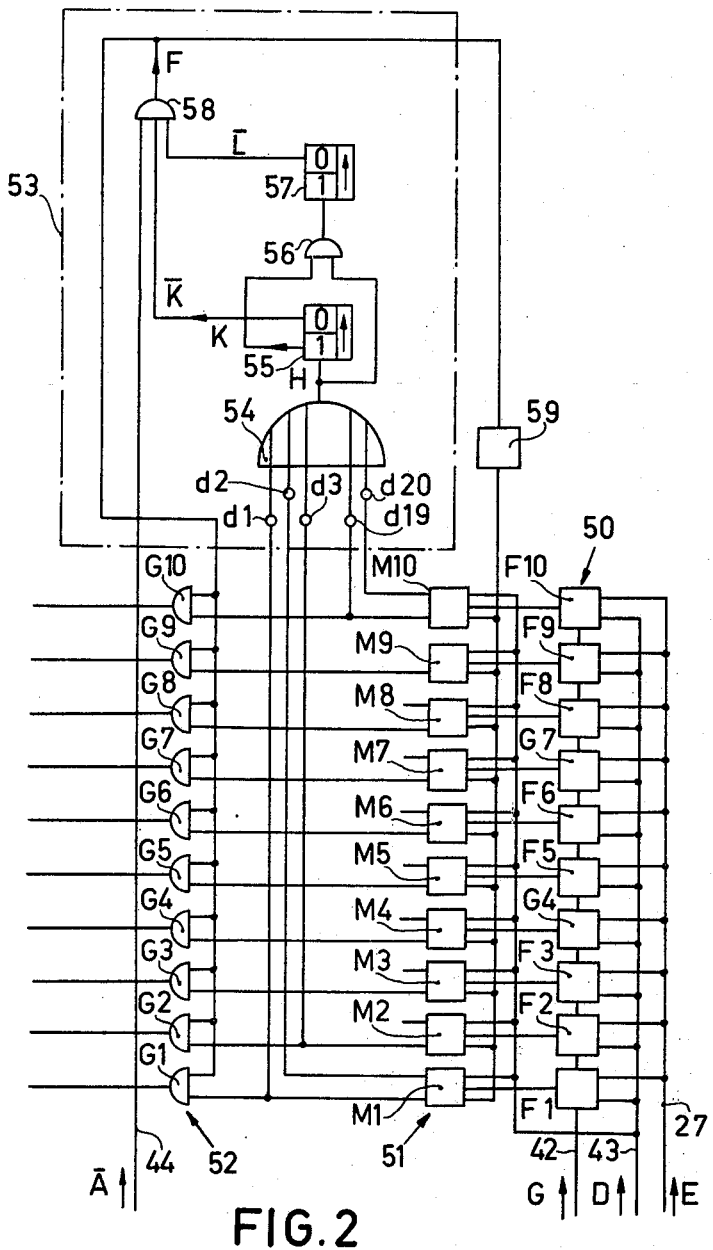
Figure 3:
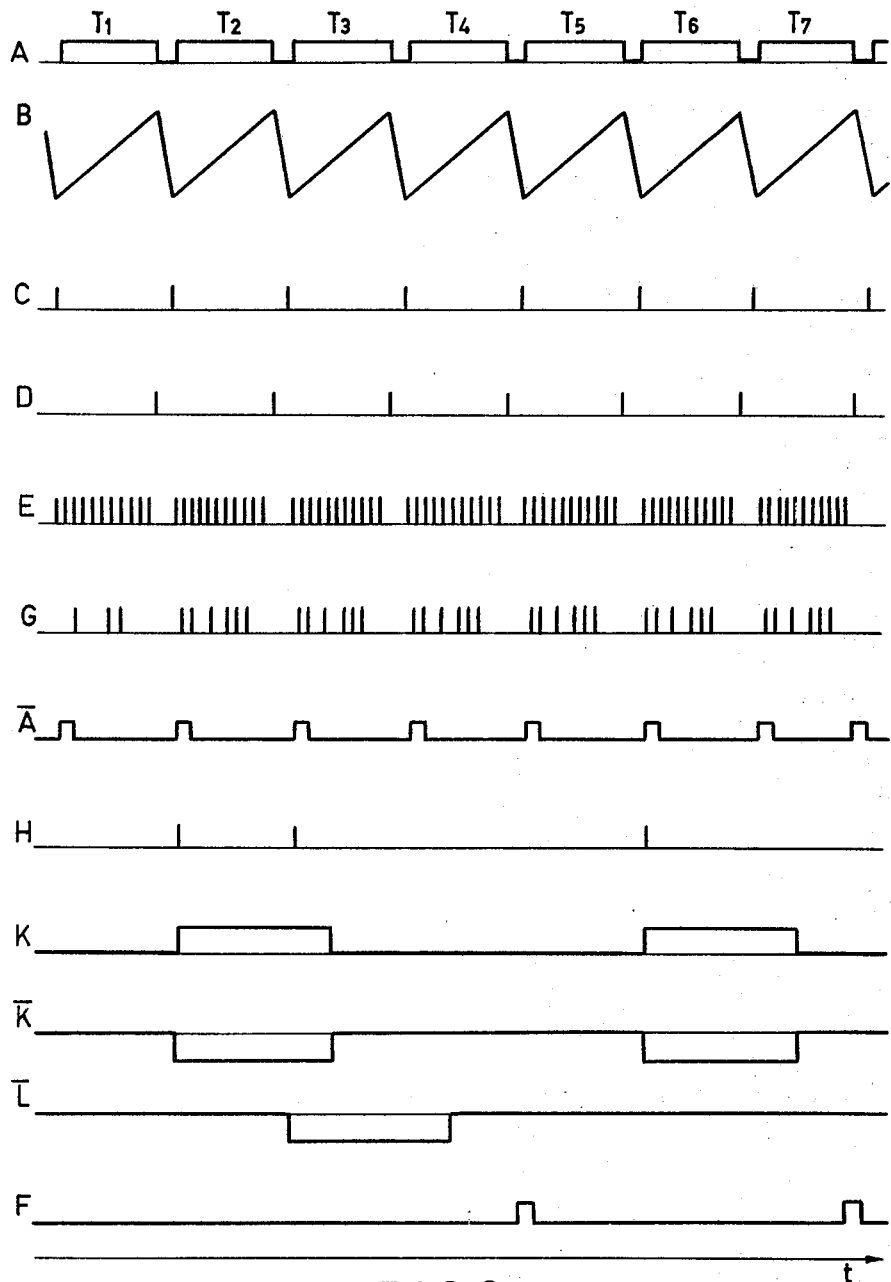
Figure 4:
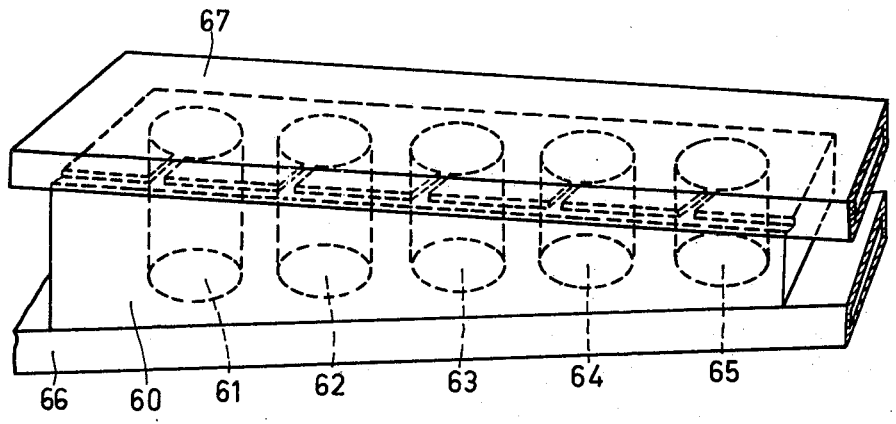
Figure 5:
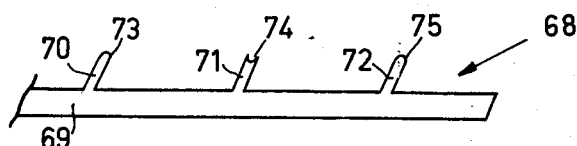
Figure 6:
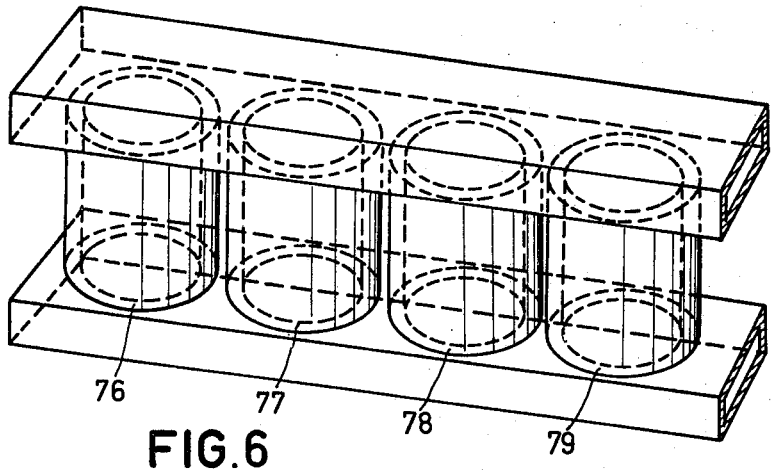
Figure 7:
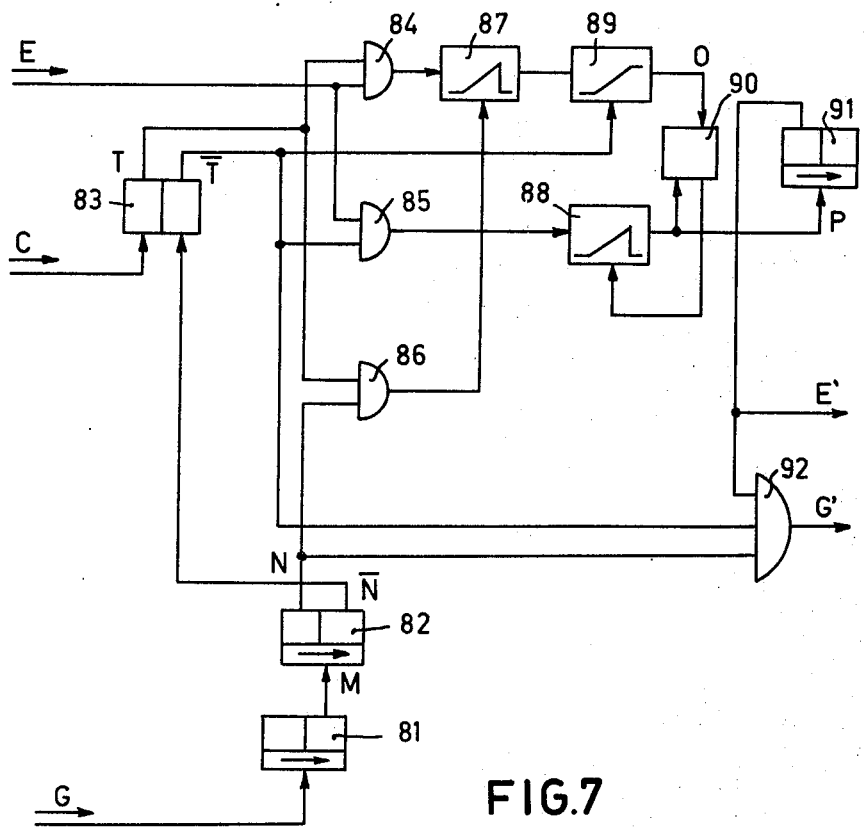
Figure 8:
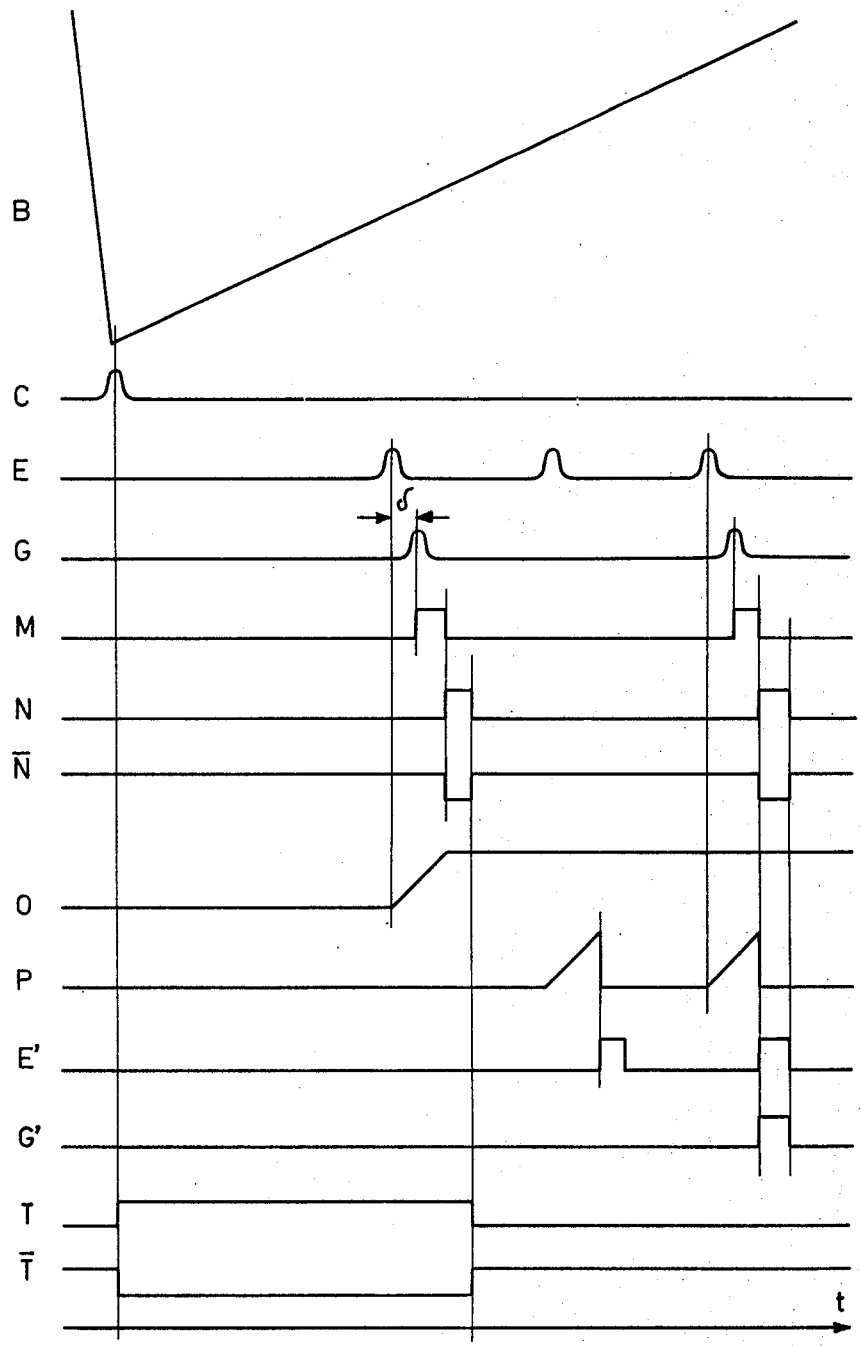

The invention is now explained more fully in connection with the accompanying drawings in which FIG. 1 shows a block diagram of an identification equipment according to the invention operating within the microwave range, FIG. 2 shows a block diagram of an evaluation device which can suitably be used in connection with the shown identification equipment, FIG. 3 shows a number of time diagrams for explanation of the function of the equipment, FIG. 4 shows a suitable embodiment of reply unit with cavity resonators, FIG. 5 shows a code mask adapted to be used in the reply unit according to FIG. 4, FIG. 6 shows a preferred embodiment of the reply unit, FIG. 7 shows a block diagram of a device for compensating for temperature differences between cavity resonators in the reply unit and in the detecting station, FIG. 8 shows time diagrams for explaining the function of the device according to FIG. 7.

In FIG. 1 reference numeral 1 designates a high frequency generator operating within the microwave range, for example at a wave length of the magnitude 2–10 cm. The high frequency generator has its output connected to two wave guides 2 and 3 of which the said last wave guide 3 terminates in a wave guide horn 4. The coupling between the high frequency generator and the wave guides 2 and 3 is such that the main portion of the energy is fed to the wave guide horn 4 through the wave guide 3, while only a small portion of the energy is led to the wave guide 2 for producing reference and control pulses. The high frequency generator is a backward wave oscillator which is characterized in that the delivered frequency varies with the voltage applied to a control electrode. The backward wave oscillator cooperates according to the invention with a sweep circuit 5 consisting of a flip-flop 6 and an integrator 7. The flip-flop circuit 6 is assumed in the shown example to be of bistable type and is controlled from the output of two detectors 8 and 9. The said detectors are connected to the output of the high frequency generator through two cavity resonators 10, 11 which serve as coupling means between two wave guides 12, 13 and the said wave guide 2. The cavity resonators 12, 13 are tuned to the limit frequencies of the required frequency sweep. The integrator 7, which is controlled from the flip-flop circuit 6 and delivers its output voltage to the frequency control electrode of the back wave oscillator 1, is furthermore provided with a switching circuit (not shown) for switching its time constant between two different values. The switching circuit is controlled from the output of the detectors 8 and 9.

The inquiry device also comprises, in the shown example, ten cavity resonators 14–23 for producing reference pulses for evaluation purposes. These cavity resonators serve as coupling means between the said wave guide 2 connected to the output of the high frequency generator and a wave guide 24 which leads the energy coupled through the resonators to a detector 25. The output of detector 25 is connected to a first input of an AND-gate 26, the second input of which is connected to that output of the flip-flop circuit 6 which is used for control of the integrator. A voltage will appear upon the output lead 27 of the AND-gate 26 only if a voltage is present on both of its inputs.

The resonance frequencies of the cavity resonators 14–23 are suitably distributed evenly over the frequency range of the high frequency generator 1.

The reply unit shown to the left in FIG. 1 consists of two wave guides 28 and 29 each connected to a wave guide horn 30 and 31, respectively, and connected to each other through, in the shown example, six cavity resonators 32–37. The wave guide horn 30 receives the energy transmitted from the inquiry device through the wave guide horn 4, while the horn 31 retransmits the energy coupled through the cavity resonators to the inquiry device. The resonance frequencies of the cavity resonators of the reply unit are distributed within the frequency range of the high frequency generator in the same way as the resonance frequencies of the cavity resonators included in the inquiry device for producing reference pulses, however, with the difference that some of the cavity resonators at the reply side are either omitted or disabled by means of a code mask. The wave guides are terminated by suitable impedances 38, 39.

The re-transmitted energy is received on the inquiry side through a wave guide horn 40 and fed to a detector 41. The signal from detector 41 containing the information required for the identification is fed to the evaluation device shown in FIG. 2 through a lead 42.

To the evaluation device are also applied the output pulses from the detector 9 through a lead 43 and the inverted output voltage from the flip-flop 6 through a lead 44.

For eliminating the risk of direct coupling between the wave guide horn 4 and the horn 40 as effectively as possible, the two cooperating wave guide horn pairs 4, 30 and 31, 40 are suitably rotated 90° in relation to each other, whereby the polarisation planes of the energy in the two transmission paths will also be rotated 90° relative to each other. The wave guide horns may furthermore suitably be filled with a dielectric material for preventing collection of dirt.

The device functions basically such that the high frequency generator is forced by the integrator to produce successive frequency sweeps, and electromagnetic energy during each such sweep is coupled back to the receiving horn 40 of the inquiry device through the cavity resonators of the reply unit as soon as the frequency of the electromagnetic energy coincides with the resonance frequency of any of the cavity resonators of the reply unit. The detector 41 will as a result deliver a pulse series in which presence of a pulse at a certain time position relative to the frequency sweep indicates presence of corresponding cavity resonator in the reply unit and absence of pulse indicates that corresponding cavity resonator is missing or doubled.

The function is illustrated by means of the diagrams in FIG. 3 where diagram A shows the output voltage of flip-flop circuit 6 fed to the integrator, B shows the frequency variation of the high frequency generator 1 with time, C shows the output pulses from detector 8, D shows the output pulses from detector 9, E shows the output pulses from AND-gate 26 and G shows the output pulses from detector 41. T1–T7 in FIG. 3 are successive measuring intervals separated by a short return interval.

The flip-flop is assumed initially to be in zero position and at this time delivers zero voltage to integrator 7 (A in FIG. 3). The integrator having a low time constant at this moment produces a voltage which varies rapidly with time and produces a corresponding rapid frequency sweep, the return sweep, of the high frequency generator (diagram B in FIG. 3). When the generated frequency reaches the resonance frequency of resonator 12 then detector 8 will deliver a pulse (C in FIG. 3) which pulse switches flip-flop 6. The pulse from detector 8 also switches the time switching circuit of the integrator so that the said time constant now assumes its higher value. The output voltage of the integrator therefore will vary slowly in opposite direction and produces a slow sweep of the frequency of signal generator 1, until the frequency reaches the resonance frequency of resonator 14. Then detector 9 will deliver a pulse (D in FIG. 3) which pulse returns flip-flop 6 to zero position and at the same time changes the time constant of the integrator to its lower value. The output voltage of the integrator and therefore the frequency of the signal generator now varies rapidly until the resonance frequency of resonator 12 is again reached. Then flip-flop 6 and the time constant of the integrator are switched and a new frequency sweep starts etc.

Each time the frequency of the generator 1 coincides with the resonance frequency of any of the resonators 14–23 coupling will be established between the wave guides 2 and 24 and consequently an output pulse will be delivered from detector 25. AND-gate 26 receives voltage from the flip-flop 6, during the slow frequency sweep whereby all ten produced pulses during this sweep will pass through the gate and arrive to the evaluation device (see diagram E in FIG. 3). Contrarily no voltage is led from flip-flop 6 to the gate 26 during the rapid return sweep and the produced pulses during this sweep will consequently be blocked by the gate.

Electromagnetic energy transmitted to the reply unit will as mentioned be coupled back to the receiving horn of the inquiry device through the cavity resonators situated in the reply unit provided that the reply unit is situated within the working range of the inquiry device. Each resonator will then give rise to a pulse at the output of detector 41, which pulse is led to an evaluation device (see diagram G in FIG. 3). In the first moment when the coupling between the transmitting and receiving horns of the inquiry device and reply unit is weak during the movement of the reply unit relative to the inquiry device it is possible that an erroneous response is produced. This is assumed to have occurred during the first frequency sweep T1 in FIG. 3.

The pulses produced by the cavity resonators of the inquiry device will coincide in time with the reply pulses from the reply unit due to the fact that the inquiry device comprises the same resonance frequencies as the reply unit. The pulses from the output of AND-gate 26 can therefore be used as time reference for the reply pulses.

The shown evaluation device consists according to FIG. 2 of a shift register 50 and a memory 51. Both shift register and memory are composed by bistable circuits F1–F10 and M1–M10, respectively, of a type known per se and each have each a number of such bistable circuits or stages equal to the number of resonance circuits used for producing reference pulses in the inquiry device, i.e. in the present case ten stages. The said code pulse series G from detector 41 are led to the first stage F1 in the shift register, while the reference pulses E from AND-gate 26 are applied to the shift inputs of the stages F1–F10. The pulses D from detector 9 indicating the end of a frequency sweep are led to all stages F1–F10 in the shift register and furthermore to all stages M1–M10 in the memory in order to in a way known per se transfer the information stored in the shift register to the memory under simultaneous zero setting of the shift register.

Each stage of the memory has one output connected to a first input of an AND-gate G1–G10 included in a blocking device 52, which AND-gates have a second input connected to the output of a device 53. The device 53 produces output pulse only if in the shown example *three successive sweeps give rise to the same registration in the shift register*. The device 53 consists of an OR-gate 54 with twenty inputs connected to the outputs of the individual stages M1–M10 of the memory 51 through differentiating circuits $d1$, $d2$ ... $d20$. The OR-gate 54 produces output pulse of a certain polarity when a voltage change corresponding to the selected polarity appears upon any of the inputs of the gate. Output pulse will be received from gate 54 as soon as any of the stages of the memory is switched in either direction due to the fact that both outputs of the memory stages M1–M10 are monitored. The output pulse from OR-gate 54 is used to switch a monostable flip-flop 55 having a return time which is somewhat longer than the period time of the frequency sweep. The output pulse from OR-gate 54 is also led to a first input of an AND-gate 56, the second input of which is connected to one output from flip-flop 55. The AND-gate 56 is open when flip-flop 55 is in position 1 and blocked when the flip-flop is in position 0. The output of AND-gate 56 is connected to a second monostable flip-flop 57 having a return time which also somewhat exceeds the period time of the frequency sweep. The monostable flip-flop 57 is thus switched by the output pulse from OR-gate 54 provided that the preceding flip-flop 55 is in position 1. An output AND-gate 58 is connected on the one hand to the two monostable flip-flops 55 and 57 and on the other hand to the sweep flip-flop 6. The AND-gate 58 produces output pulse only if the two monostable flip-flops 55 and 57 are in position 0 and the flip-flop 6 is also in the 0-position, i.e. the position when the rapid return sweep is produced.

The evaluation procedure is illustrated by the lower diagrams in FIG. 3, wherein $\overline{A}$ shows the pulses led from the sweep flip-flop 6 to the output gate 58, diagram H shows the output pulses from OR-gate 54, K shows the pulses which are led from flip-flop 55 to AND-gate 57, $\overline{K}$ shows the pulses led from flip-flop 55 to AND-gate 58 and $\overline{L}$ shows the pulses led from flip-flop 57 to AND-gate 58. The last diagram F in FIG. 3 shows the pulses which are derived from AND-gate 58 and form output pulses from device 53. The output pulses F from AND-gate 58 are according to FIG. 2 led to all AND-gates G1–G10 in the device 52 and furthermore through a delay device 59 to all stages M1–M10 in the memory 51. At the appearance of output pulse F from 58 are all AND-gates in the device 53 opened and the information stored in the memory 51 is then led through the respective AND-gate to an indication or computer device (not shown). The delay device 59 has a time delay which somewhat exceeds the pulse length of pulses F from AND-gate 58. The delayed pulse F from device 59 produces switching of all stages in memory 51 to 0-position.

It has been assumed in FIG. 3 that the re-transmitted signal during the first frequency sweep is incorrect due to weak coupling between the reply unit and the inquiry device, while the remaining sweeps produce correct information. Before the reply unit has come within reach of the inquiry signal all stages are in the shift register and the memory in 0-position.

The evaluation of the reply information is effected in the following way.

When the frequency of the generator during a sweep reaches the resonance frequency of the cavity resonator in the inquiry device which has the lowest or highest frequency dependent upon the sweep direction, then AND-gate 26 will deliver the first reference pulse E (FIG. 1). This pulse is led to the shift inputs of all stages in the shift register 50 but as all stages in the register are in 0-position the shifting has no effect at this moment. If the corresponding cavity resonator is present in the reply unit and this is within reach of the signal from the inquiry device, pulse E is simultaneously received from detector 41, which pulse will be registered in the shift register in that the first stage F1 is switched to position 1. If no pulse E appears, F1 remains in 0-position. When the frequency has reached the resonance frequency of the second resonator in the inquiry device the digit 1 in F1, if present, will be shifted to F2 at the same time as presence of corresponding cavity resonator in the reply unit is registered in that F1 remains in position 1; otherwise F1 is switched to position 0. The information upon reaching of the next resonance frequency is again shifted one step to the right at the same time as possible pulse caused by the presence of corresponding cavity resonator in the reply unit is registered in F1 etc. After the reception of the 10th and last pulse E from AND-gate 26 the first E-pulse received, if present, will be stored in the last stage F10, while the next pulse will be stored in F9 etc. Immediately thereafter pulse D from detector 9 arrives whereby the conditions of the different stages in the shift register 50 is transferred to corresponding stages in the memory 51 at the same time as the shift register is zeroed. As the memory stages were initially in 0-position output pulse H from OR-gate 54 is produced and the flip-flop 55 switched to position 1. The pulse H can, however, not switch flip-flop 57 as AND-gate 56 is blocked at the moment for appearance of H-pulse (flip-flop 55 in 0-position). Presence or absence of signal frequencies in the re-transmitted signal is during the next following sweep T2 registered in the same way in the shift register 50 and the information transferred from shift register to the memory at the end of the sweep. As according to the foregoing it is assumed that the same information is not received during the two first sweeps, at least one memory stage will be switched and output pulse H from OR-gate 54 is received at the end of the second sweep T2, see diagram 3. The monostable flip-flop 55 is still in position 1 and output pulse H therefore will switch flip-flop 57 to position 1. The flip-flop 57 will then deliver a blocking pulse to the AND-gate 58. New registering in the shift register 50 and transfer of the information to the memory 51 at the end of the frequency sweep is effected during the following frequency sweep T3. In this case it is assumed that the same information is received as during the foregoing period, and therefore none of the stages in memory 51 is switched. No output pulse H is received from OR-gate 54 and the flip-flop 55 which has returned to position 0 during T3 remains in position 0. The voltage pulse $\overline{A}$ can, however, not produce any output pulse F from AND-gate 58 at the end of sweep T3 as the monostable flip-flop 57 is still in position 1 and blocks the gate 58. During the following sweep T4 is the same information again registered in shift register 50 and no stage in the memory is switched. No output pulse H is received from OR-gate 54, and the flip-flop 55 remains in 0-position. 57 returns to position 0 during the period T4 and at the end of the 4th period T4 thus both flip-flops are in 0-position. The pulse $\overline{A}$ at the end of this period will therefore produce a corresponding output pulse F from the output of AND-gate 58, which output pulse F opens all AND-gates in the blocking device 52 so that the information stored in the memory 51 is led further to the indicator or data computor device. The output pulse F also produces zero setting of all stages in the memory 51 through the delay device 59.

If it is assumed that the movable reply unit is still effectively coupled to the inquiry device a new correct registering will be received in the shift register 50 during the following sweep period T5, which registering is transferred to memory 51 at the end of the period. As the memory was initially in 0-position an output pulse H will be received from the OR-gate 54 and flip-flop 55 is switched. Provided that correct information is received from the reply unit during the next period T6 no stage in the memory 51 will be switched at the end of the said period T6, whereby no pulse H is produced and flip-flop 57 remains in position 0. During the next following period T7 returns flip-flop 55 to position 0. At the end of this period both 55 and 57 are thus in 0-position and a pulse F is again received from AND-gate 58.

By means of logic circuit elements it is possible to further decrease the probability for erroneous evaluation in that 4, 5 or more successive and equal registrations are necessary before the blocking is released and the stored information is led out for computation or indication purposes.

FIG. 4 shows a perspective partially transparent view of a suitable embodiment of the reply unit with cavity resonators and wave guides. The cavity resonators included in the inquiry device may be of the same construction apart from the fact that no code mask is required in this case.

The shown reply unit consists of a metallic body 60 which is tapered toward one of its ends and which contains apertures 61–65. The wave guides 66, 67 are arranged on each side of the body 60 having their side walls bearing against the surfaces of the body 60 containing the said apertures. The apertures form cavity resonators which are coupled to the respective wave guide through circular openings in the side wall of the respective wave guide. The cavity resonators will have different lengths due to the varying height of the body 60 and hereby a successive variation of the resonance frequency from cavity to cavity is produced.

At the separation line between wave guide 67 and the body 60 there is a slot in which the code mask 68 shown in FIG. 5 can be introduced. The code mask 68 consists of a number of metallic tongues 70–72 fixed upon a common body 69, which tongues may either have a convex end as shown at 73 and 75 or a concave end as shown at 74. In the said first case the actual cavity will be screened-off at introduction of the code mask in that the opening between the wave guide and the cavity is covered by the metallic tongue, while in the said last case the opening between cavity and wave guide will remain free. It is also possible to omit the metallic tongues at those places where no blocking of the cavity resonator is to take place. By the use of such code masks all reply units can be shaped in the same way. Only the code mask will have varying shape in different units. It is also possible to achieve recoding in a simple way by replacing the code mask. The cavity resonators of the inquiry device may suitably be shaped in the same way but without code mask or with a code mask which gives free passage to all cavities.

The resonators in the reply unit may alternatively be of constant height and varying diameter. In FIG. 6 is shown a small section of such a reply unit, in which the resonators are formed by a number of metallic tubes 76, 77, 78, 79 arranged in parallel between the two wave guides. The tubes are of the same length but varying inner diameter from tube to tube. An advantage for this type of resonators is that a wider frequency band will be available without risk for false resonator modes in the resonators. Thus it is possible for example to operate in the frequency band from 14–16 gHz. without false resonances. This results in that a very large number of resonators, of the order 50–60 or even more, can be used in the reply unit resulting in a corresponding number of information bits in the coded reply information.

A suitable code is the two-out-of-five code, in which the resonators are divided into groups of five resonators and each such group cooperating for forming a digit according to the said code.

For disturbance suppression in order to eliminate the risk that false pulses are indicated in the evaluation device as reply pulses it is suitable to block all pulses from the receiving antenna 40 (FIG. 1) which do not coincide in time with a reference pulse from the reference resonators 14–23. If such a time discrimination of the reply pulses is to be used it will be necessary to ensure that the pulses from corresponding resonators in the reply unit and the reference unit appear at the same moments. However, the dimensions of the resonators and consequently the resonance frequencies are dependent upon temperature, and therefore small temperature differences between the resonators in the reply unit and the reference resonators will cause a small displacement of the resonance frequencies in the reply unit relative to the reference resonance frequencies resulting in a corresponding time displacement between the reply pulses and reference pulses. The temperature deviation can normally be made small by arranging the reference resonators in proximity of the reply unit. However, it cannot be avoided that under unfavourable circumstances a temperature deviation will appear, for example due to warming up of the resonators in the reply unit from the wagon. A time discrimination of described kind must therefore be combined with an automatic temperature compensation.

This can for example be made by means of additional resonators of equal dimensions in the reply unit and the reference unit which are not included in the reply code and only used for setting a compensation voltage in dependence upon a measured time difference between the extra pulse from the reply unit and the corresponding pulse from the reference unit. It is then assumed that all pulses from corresponding cavities are time displaced the same value and the compensation voltage is used to delay for example the reference pulses such that they will coincide in time with corresponding reply pulses.

A circuit for effecting such a temperature compensation is shown in FIG. 7. This circuit is adapted to be connected between the pulse generating arrangement shown in FIG. 1 and the evaluation device shown in FIG. 2.

The temperature compensation circuit consists according to FIG. 7 of a fix time delay for the reply pulses G shown in the form of a monostable flip-flop 81, a pulse shaping monostable flip-flop 82 for the reply pulses, a monostable flip-flop 83 controlled by the starting pulse C for the frequency sweep (FIG. 1), three input gates 84, 85, 86, two sweep circuits 87, 88, a memory circuit 89, a comparing device 90, a pulse shaping monostable flip-flop 91 for the reference pulses and an output gate 92.

The function of the compensation circuit is as follows, reference being made to the waveform diagrams shown in FIG. 8, in which the different diagrams are designated in the same way as the corresponding points in the block diagram according to FIG. 7 where the voltages in question appear.

At the start of a frequency sweep a pulse C appears. This pulse is used to switch flip-flop 83. In switched position flip-flop 83 delivers voltages $T$ and $\bar{T}$ to the input gates such that gates 84 and 86 are open and gate 85 closed. When the frequency is increasing it will first reach the resonance frequencies for the said additional resonators, it being assumed in FIG. 8 that the temperature difference between the reply unit and the reference unit is such that pulse is first received from the additional resonator in the the reference unit and a short time interval later pulse from the additional resonator in the reply unit. The pulse from the reference unit passes through gate 84 and starts a linear sweep in sweep circuit 87, while the pulse from the reply unit switches the delay flip-flop 81. When flip-flop 81 returns to its initial position it switches pulse shaping flip-flop 82. The voltage rise at the left hand output from flip-flop 82 passes through gate 86 and stops the linear sweep in circuit 87. The sweep voltage from 87 at the end of the sweep is maintained in a memory circuit 89, the output voltage 0 of which thus will be a measure of the time delay δ plus the fix delay in flip-flop 81. The voltage flank appearing at the right hand output of flip-flop 82 at return of the said flip-flop is used to reset flip-flop 83, which thereafter remains in reset position during the whole frequency sweep until the beginning of the next sweep. At resetting the voltages at the output of flip-flop 83 are altered so that gates 84 and 86 are closed and gate 85 opened. The next coming reference pulse E therefore passes through gate 85 and starts sweep circuit 88 which has exactly the same sweep velocity as circuit 87. The voltage from sweep circuit 88 is compared with the constant stored voltage in memory circuit 89 and at equal voltages from 88 and 89 the comparing device 90 delivers a voltage pulse to sweep circuit 88, which stops the sweep. The rear flank of the sweep voltage from 88 switches flip-flop 91 which delivers a delayed reference pulse E'. As the sweep velocities and the final sweep voltages are the same in both circuits 87 and 88, the time delay of the reference pulse and all following reference pulses will be exactly equal to the sum of time difference δ and the fix delay in 81. The fix delay in 81 is chosen such that the sum of δ and the fixed delay in 81 is always positive even at maximum temperature difference in such direction that the reply pulse G appears before the reference pulse E (δ negative). The delayed reference pulse E' is led on the one hand to the evaluation device and on the other hand to an input of output gate 92. At another input, gate 92 receives the delayed reply pulse from flip-flop 82 and on a third input a control voltage from flip-flop 83. Due to the described automatic setting of the delay of reference pulse E' these reference pulses E' will always coincide in time with possible reply pulses N from the output of flip-flop 82, whereby the pulses N will pass through gate 92 and form an output pulse signal G'. In the contrary if false pulses appear at the output of flip-flop 82 in wrong time moments these pulses will be blocked by gate 92.

The fix time delay 81 and the adjustable delay may of course change place so that the reference pulses are instead delayed by a fixed amount and the delay of the reply pulses adjusted in accordance with the measured time difference.

The reply pulses G' and reference pulses E' can be treated in the same way as described previously for pulses E and G.

Instead of using a reply unit operating such that only those frequencies are re-transmitted which coincide with the resonance frequencies of the resonators in the reply unit it is alternatively possible to modify the reply unit such that it re-transmits all frequencies except the said resonance frequencies resulting in dips in the re-transmitted energy for each resonance frequency. This is achieved in a simple way by arranging the receiving wave guide horn and re-transmitting wave guide horn at each end of one and the same wave guide and connecting the cavity resonators in parallel between this wave guide and a second wave guide with absorbing material so that the microwave energy each time its frequency coincides with the resonance frequency of any of the resonators is shunted away and dissipated in the said second wave guide. The evaluation will in this case consist in detection of the said dips in the re-transmitted energy, which can be effected in a way similar to that described for detection of pulses.

What is claimed is:

1. A system for the identification of an object adapted to move past a detecting station, of the type in which said detecting station is provided with an inquiry device for transmitting an inquiry signal and said object is provided with a reply unit for responding to said inquiry signal in a manner characteristic of the object, wherein said inquiry device comprises a source of high frequency electromagnetic energy, means for continuously sweeping the frequency of said energy across a predetermined frequency band, and first directional antenna means for transmitting said energy toward said reply unit, and said reply unit comprises a waveguide system having a plurality of cavity resonators having different resonant frequencies within said predetermined band for forming a code characteristic of said object, second directional antenna means for receiving said transmitted energy and applying the received energy to said cavity resonators, whereby said received energy is modified by said cavity resonators in response to their natural frequencies, and a third directional antenna means for transmitting said modified energy toward said detecting station, said detecting station further comprising fourth directional antenna means for receiving said modified energy, and means for determining the modification of the received modified energy caused by said cavity resonators.

2. The system of claim 1, characterized in that the reply unit comprises two wave guides, said cavity resonators being arranged in parallel between the wave guides for coupling the wave guides to each other through said resonators, one of the wave guides having an input end connected ot the said second antenna means for reception of the transmitted high frequency wave energy and the second wave guide having an output end connected to said third antenna means for re-transmission of energy, whereby high frequency wave energy is coupled from second antenna means to the third antenna means upon coincidence between the frequency of the energy received by said second antenna means and the natural frequency of any of the resonators in the reply unit.

3. The system of claim 1, in which polarized microwave energy is used for transmission to the reply unit and re-transmission from the reply unit, characterized in that the polarization directions in the two transmission paths are substantially 90° with respect to each other.

4. The system of claim 1 wherein said detecting station comprises a plurality of reference cavity resonators corresponding to the resonators in the reply unit, means for applying energy from the said source to said reference cavity resonators, means for producing reference pulses from said reference resonators, means for producing reply pulses from the energy received from said fourth antenna means, a gate circuit, means for applying said reference and reply pulses to said gate circuit to produce output pulses by coincidence, and recording means responsive to said output pulses for recording a coincidence in time between a reply pulse and a gate reference pulse.

5. The system of claim 4, wherein said detecting station is provided with a temperature compensation device comprising time delay means for imparting to the reply pulses or the reference gate pulses a time delay which is dependent upon a measured time difference between pulses from corresponding cavities in the reply unit and reference cavities in order to make the pulses from corresponding cavities to coincide in time.

6. The system of claim 1, wherein the cavities are of the same inner diameter and varying length from cavity to cavity.

7. The system of claim 1, wherein the cavities are of the same length and varying inner diameter from cavity to cavity.

8. The system of claim 1, wherein the cavities are formed by apertures bored in a common metallic body.

9. The system of claim 6 in which the reply unit comprises resonators of all frequencies, comprising means for disabling certain ones of the resonators according to a predetermined code.

10. The system of claim 1, wherein the determining means to store information about the frequencies present in the re-transmitted energy during at least two successive identification periods, and blocking means arranged for blocking reading-out from the memory means if the same information is not registered during at least two successive identification periods.

(References on following page)

References Cited

UNITED STATES PATENTS

| | | | |
|---|---|---|---|
| 3,145,380 | 8/1964 | Currie | 343—6.8 X |
| 3,169,242 | 2/1965 | Davis et al. | 343—6.5 |
| 3,172,106 | 3/1965 | Zaleski | 343—6.8 X |
| 3,182,314 | 5/1965 | Kleist et al. | 343—6.8 X |
| 3,210,759 | 10/1965 | Davis et al. | 343—6.5 |
| 3,247,510 | 4/1966 | Molnar et al. | 343—6.5 |
| 3,270,338 | 8/1966 | Watters | 343—6.5 |
| 3,273,146 | 9/1966 | Hurwitz | 343—6.8 |

RODNEY D. BENNETT, *Primary Examiner.*

CHESTER L. JUSTUS, *Examiner.*

D. C. KAUFMAN, *Assistant Examiner.*